Aug. 7, 1951   C. S. RENWICK, JR   2,563,275
FISH LURE
Filed Aug. 1, 1949
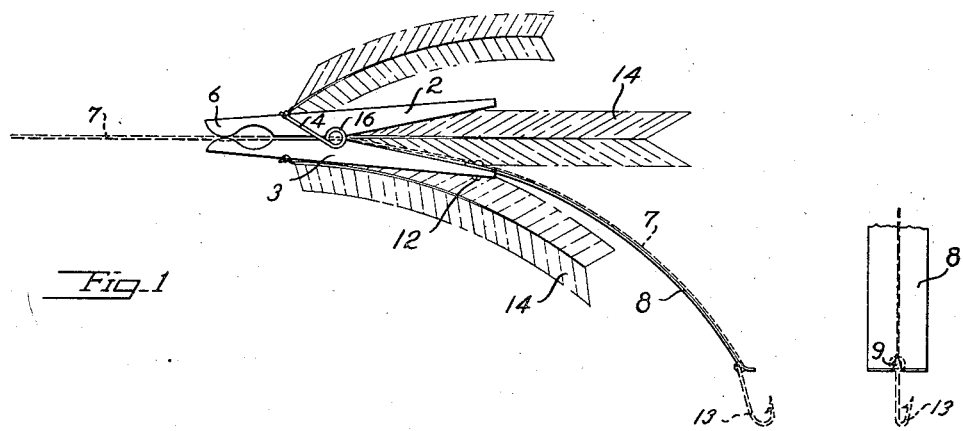
Fig. 1
Fig. 2
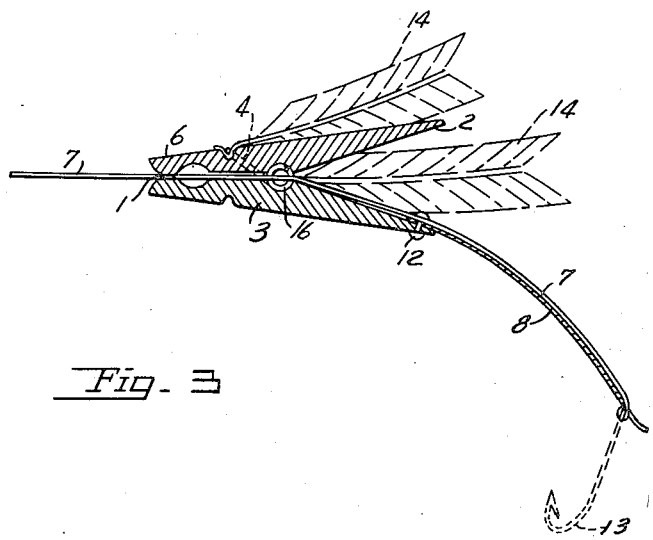
Fig. 3
INVENTOR
CHARLES S. RENWICK, JR.
BY Charles S. Evans
his ATTORNEY Patented Aug. 7, 1951

2,563,275

UNITED STATES PATENT OFFICE 2,563,275

FISH LURE

Charles S. Renwick, Jr., Richmond, Calif.

Application August 1, 1949, Serial No. 107,919

2 Claims. (Cl. 43—42.36)

My invention relates to fish lures; and one of the objects of the invention is to provide a fish lure that is easily and quickly attached or detached from a fish line without disturbing the leader or hook.

The invention has other objects which will be explained in the following description of that form of the invention which is illustrated in the drawings. It is to be understood that the invention is not limited to this single embodiment, but may be included in a plurality of forms as set forth in the claims.

Referring to the drawings:

Figure 1 is a side elevation of my fish lure, shown attached to the leader of a fish line above the hook.

Figure 2 is a rear view of the end portion of the tail that forms a part of my fish lure.

Fig. 3 is a vertical longitudinal section of a fish lure similar to the one shown in Fig. 1.

My fish lure comprises a body formed of wooden arms 2 and 3 pivotally connected and resiliently pressed together by the spring 4 after the manner of a common wooden spring clothes pin. The jaws 6 provide a firm clamp easily attached to or detached from the leader 7 of a fish line, or the line itself, working from the side of the leader or line; and the wood of the body gives a certain desired buoyancy to the lure which is an important factor in its behavior in the water. Preferably the arms are dipped or painted both for protection and appearance. It is preferred to very lightly groove one of the abutting faces of the jaws, as at 1, to afford a better grip on the line.

One of the arms at the end opposite the clamp, is extended in a curved thin resilient metallic strip 8, having a V-notch 9 in its free end. This strip constitutes a tail for the body formed by the arms; and because of its resilience and curve, is a controlling factor in the movement of the lure in the water. A rivet 12 through aligned holes in strip and arm holds the two parts together. The free end of the strip is preferably bent out of line a small amount as shown; and the notch is of a character to provide secure seating for the eye of the hook 13.

Secured in almost haphazard arrangement under the spring 4, and grouped around the body and between the arms 2 and 3, but all pointing toward the jaws 6, are a plurality of feathers 14 constituting fins for the body of the device. These also play an important part in the behavior of the lure.

It is contemplated that a fisherman will have in his kit a variety of my lures, differing in the color, arrangement and number of the feathers, and the color of the body. With however jaundiced an eye the fish may contemplate assortments of colors, they are of vast and immediate appeal to the fisherman. At least there is no conclusive evidence that fish are wholly immune to some reaction to color; and their use on lures of all kinds has been justified by experience.

With regard to the assumed personal preference of the intended catch, and possibly with some regard to his own, the fisherman selects a lure and places the end of the leader next the hook in the notch. He then runs the leader back over the tail and pulls it taut between the jaws, preferably slipping it under the outer coil 16 of the spring. This securely attaches the lure to the leader. Detachment is equally simple, so that when the fish seem a bit difficult, a succession of different lures may be tried without disturbing the connection of hook or leader or any portion of the tackle.

When my lure properly attached to a leader and line is thrown into fast water or towed behind a boat, its movements closely simulate something alive and very active; and apparently with great appeal to the hungry or possibly quarrelsome or even resentful fish, because over long trials under conditions where the use of lures of generally similar size and type were indicated, I have found more than a usual success in attracting and hooking the fish.

While I have referred in the above explanation to attachment of my lure to a leader tied into the eye of a hook, it is obvious that the lure can be attached to a line or to a snelled hook. In the latter case a heavy knot or a split shot is placed just ahead of the hook to engage in the notch.

I claim:

1. A fish lure comprising a clamp consisting of a pair of arms, a spring positioned between the arms and having the ends thereof each secured to an arm, said arms having oppositely facing recesses at one end thereof, and diverging sides at the other end thereof when in a closed position, a curved plate secured to one arm and extending rearwardly and laterally from said arm, said plate having a notch in one end thereof, one of said arms having a longitudinal notch in the forward end thereof, the notch in the plate and the latter notch lying in substantially the same plane.

2. A fish lure comprising a clamp consisting of a pair of arms, a spring positioned between the arms and having the ends thereof each secured to an arm, said arms having oppositely facing recesses at one end thereof, and diverging sides at the other end thereof when in a closed position, a curved plate secured to one arm and extending rearwardly and laterally from said arm, said plate having a notch in one end thereof, the lower arm having a longitudinal groove in the inner face thereof, the notch in the plate and the latter groove lying in substantially the same plane, said spring constituting means for securing feathers to the arms.

CHARLES S. RENWICK, JR.

REFERENCES CITED

The following references are of record in the file of this patent:

UNITED STATES PATENTS

| Number | Name | Date |
|---|---|---|
| 1,232,545 | Hilsz | July 10, 1917 |
| 1,589,065 | Gere et al. | June 15, 1926 |
| 1,623,368 | Tate | Apr. 5, 1927 |
| 1,760,445 | Shackelford | May 27, 1930 |
| 1,925,197 | Maynard | Sept. 5, 1933 |